(12) United States Patent
Spalding et al.

(10) Patent No.: US 12,011,892 B2
(45) Date of Patent: Jun. 18, 2024

(54) DOUBLE VACUUM AND POSITIVE PRESSURE FOR PASTE BOND JOINTS

(71) Applicant: The Boeing Company, Chicago, IL (US)

(72) Inventors: John F. Spalding, Seattle, WA (US); Mohamed Azdamou, Seattle, WA (US)

(73) Assignee: The Boeing Company, Chicago, IL (US)

( * ) Notice: Subject to any disclaimer, the term of this patent is extended or adjusted under 35 U.S.C. 154(b) by 62 days.

(21) Appl. No.: 17/397,443

(22) Filed: Aug. 9, 2021

(65) Prior Publication Data

US 2023/0045535 A1 Feb. 9, 2023

(51) Int. Cl.
| | |
|---|---|
| *B29C 73/04* | (2006.01) |
| *B29C 65/00* | (2006.01) |
| *B29C 65/54* | (2006.01) |
| *B29C 73/24* | (2006.01) |
| *B29L 31/30* | (2006.01) |
| *B64F 5/40* | (2017.01) |

(52) U.S. Cl.
CPC ............. *B29C 73/04* (2013.01); *B29C 65/54* (2013.01); *B29C 66/82661* (2013.01); *B29C 73/24* (2013.01); *B29L 2031/3076* (2013.01); *B64F 5/40* (2017.01)

(58) Field of Classification Search
CPC ... B29C 73/04; B29C 65/54; B29C 66/82661; B29C 73/24; B29C 73/12; B29C 73/10; B29L 2031/3076; B64F 5/40
See application file for complete search history.

(56) References Cited

U.S. PATENT DOCUMENTS

| | | | |
|---|---|---|---|
| 10,022,922 B2 | 7/2018 | Blanchard et al. | |
| 10,173,371 B1 | 1/2019 | Evens et al. | |
| 2012/0080135 A1* | 4/2012 | Evens ................. | B32B 37/0046 156/382 |

\* cited by examiner

*Primary Examiner* — S. Behrooz Ghorishi
(74) *Attorney, Agent, or Firm* — Quinn IP Law

(57) ABSTRACT

A method eliminates voids in the bond line and manipulates a thickness of the bond line. This method includes: applying an adhesive at a center of an area of a structure; placing a doubler on the adhesive over the area of the structure, wherein the doubler has a peripheral edge; and maintaining a negative pressure at the peripheral edge of the doubler while simultaneously maintaining a positive pressure at the doubler to purge entrapped gases and control a thickness of the bond line at the peripheral edge of the doubler.

20 Claims, 8 Drawing Sheets

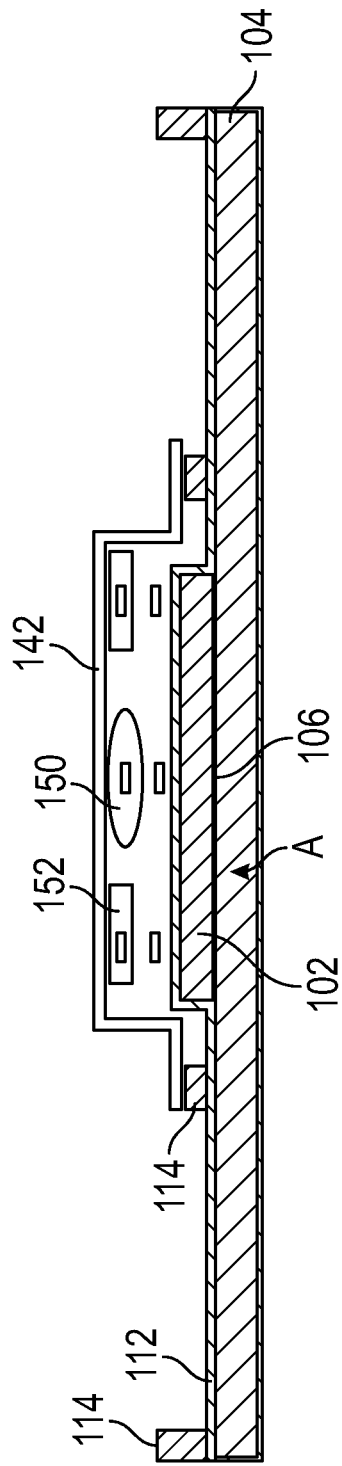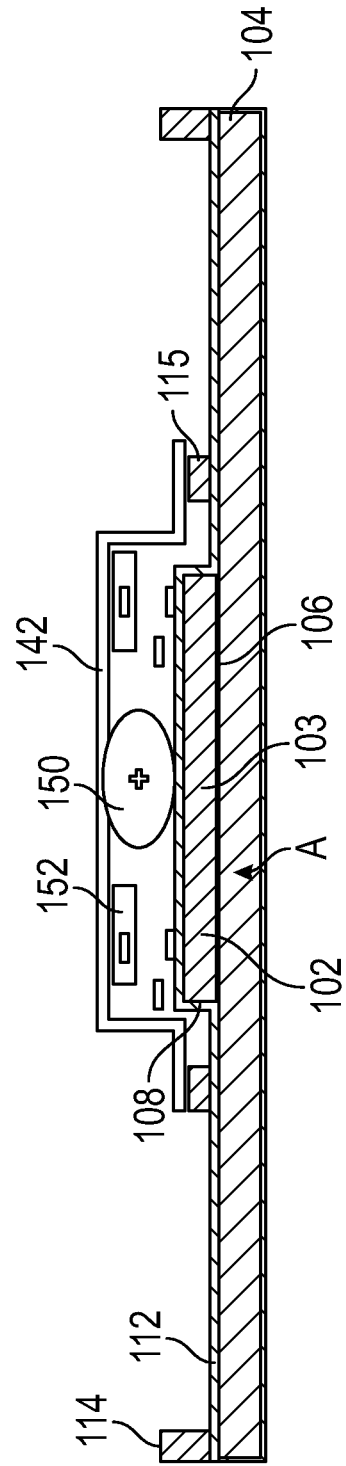

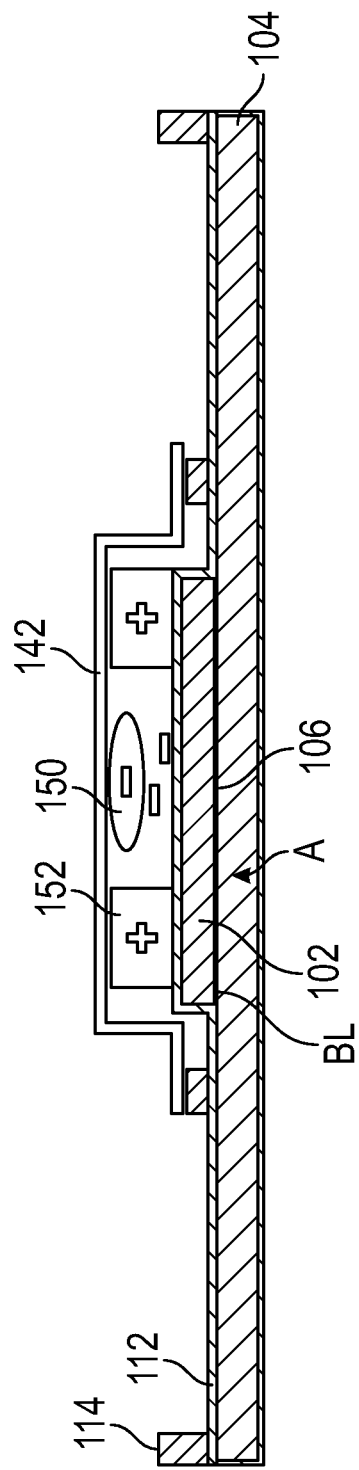

DOUBLE VACUUM AND POSITIVE PRESSURE FOR PASTE BOND JOINTS

TECHNICAL FIELD

The present disclosure generally relates to a method and system for installing a bonded doubler on a structure. In particular, the present disclosure describes a double vacuum and positive pressure method and assembly for paste bond joints.

BACKGROUND

In aircrafts, some structures have to be repaired. To do so, an object may be bonded to the structure that has to be repaired. Accordingly, those skilled in the art continue with research and development efforts in the field of bonding.

SUMMARY

The present disclosure describes an assembly that is configured to install a doubler on a structure. The structure may be a portion of an aircraft that needs to be repaired due to, for example, a crack. The doubler is configured to be placed over the structure in need of repair. The assembly may be used in a method to create a large pressure differential at the bond line created by an adhesive. In this method, high pressure is created at the center of the doubler, and low pressure is created at a peripheral edge of the doubler, thereby causing a pressure differential. As a result of this pressure differential, the adhesive is displaced radially outward away from the center of the doubler toward the peripheral edge of the doubler, causing the adhesive to purge the air entrapped along the bond line. By using this assembly and method, the thickness of the bond line at the peripheral edge of the doubler may be controlled.

In an aspect of the present disclosure, the method eliminates voids in the bond line and manipulates a thickness of the bond line. This method includes applying an adhesive at a center of an area of a structure, placing a doubler on the adhesive over the area of the structure, wherein the doubler has a peripheral edge, and maintaining a negative pressure at the peripheral edge of the doubler while simultaneously maintaining a positive pressure at the doubler to purge entrapped gases and control a thickness of the bond line at the peripheral edge of the doubler.

In an aspect of the present disclosure, the method further includes placing a first vacuum bag over the doubler, and drawing a vacuum in the first vacuum bag to apply the positive pressure to an entirety of the doubler.

In an aspect of the present disclosure, the method further includes placing a plurality of edge rings around the peripheral edge of the doubler and over the first vacuum bag. The plurality of edge rings includes a first edge ring and a second edge ring. The second edge ring is stacked on the first edge ring. The first edge ring has a first inner diameter. The second edge ring has a second inner diameter. The second inner diameter is less than the first inner diameter to allow the adhesive to move along the peripheral edge of the doubler.

In an aspect of the present disclosure, the method further includes placing a second vacuum bag over the doubler, and drawing a vacuum in the second vacuum bag to apply the negative pressure at the peripheral edge of the doubler, thereby causing the adhesive to be displaced radially outward from a doubler center to the peripheral edge to control a thickness of the bond line at the peripheral edge of the doubler.

In an aspect of the present disclosure, the method further includes cleaning the area of the structure before applying the adhesive at the center of the area of the structure.

In an aspect of the present disclosure, the method further includes sanding the area of the structure before applying the adhesive at the center of the area of the structure.

In an aspect of the present disclosure, the method further includes placing a covering over the doubler to form a doubler assembly before placing the first vacuum bag over the doubler. The covering is at least one of a peel ply, a release ply, a breather, or a combination thereof.

In an aspect of the present disclosure, the method further includes placing a pressure transfer pad on top of the first vacuum bag and at the center of the doubler. The pressure transfer pad is configured to transfer pressure applied by the second vacuum bag to the doubler.

In an aspect of the present disclosure, the method further includes placing a top hard plate on the plurality of the edge rings. The plurality of edge rings supports the top hard plate, and the top hard plate applies pressure to the pressure transfer pad upon drawing the vacuum in the second vacuum bag. Placing the second vacuum bag over the doubler includes covering an entirety of the plurality of edge rings, the doubler, and the pressure transfer pad with the second vacuum bag.

In an aspect of the present disclosure, the method further includes placing a pressure transfer pad on top of the first vacuum bag and disposed proximate to the peripheral edge of the doubler. The pressure transfer pad has an annular shape to apply pressure proximate to the peripheral edge of the doubler. The pressure transfer pad is configured to transfer pressure applied by the second vacuum bag to the doubler in the first vacuum bag. The method further includes placing a top hard plate on the plurality of the edge rings. The plurality of edge rings supports the top hard plate, and the top hard plate applies pressure to the pressure transfer pad upon drawing the vacuum in the second vacuum bag. Placing the second vacuum bag over the doubler includes covering an entirety of the top hard plate, the doubler, and the pressure transfer pad with the second vacuum bag.

In an aspect of the present disclosure, the method further includes maintaining a full vacuum in the second vacuum bag to displace air bubbles beyond the peripheral edge of the doubler.

In an aspect of the present disclosure, the method further includes venting the second vacuum bag and removing the second vacuum bag from the doubler.

In an aspect of the present disclosure, the method further includes maintaining a full vacuum in the first vacuum bag until the adhesive is fully cured.

In an aspect of the present disclosure, the method further includes venting the first vacuum bag and removing the first vacuum bag from the doubler after venting the first vacuum bag.

In an aspect of the present disclosure, the method further includes applying heat to the first vacuum bag to cure the adhesive.

In an aspect of the present disclosure, the method further includes placing at least one temperature sensor proximate to the area of the structure to measure a temperature of the adhesive when heat is applied to the first vacuum bag.

In an aspect of the present disclosure, the method further includes receiving a first sensor signal from a first sensor. The first sensor signal is indicative of a pressure inside the first vacuum bag. The method further includes receiving a second sensor signal from a second sensor, wherein the second sensor signal is indicative of a pressure inside the second vacuum bag. The method further includes controlling, using a feedback control loop, the pressure in the first vacuum bag and the pressure in the second vacuum bag based on the first sensor signal and the second sensor signal to purge entrapped gases and control a thickness of the bond line at the peripheral edge of the doubler.

The present disclosure also describes an aircraft that has been repaired using the method described above.

In an aspect of the present disclosure, an assembly for manipulating a bond line along an area of a structure, includes a vacuum tight enclosure. The vacuum tight enclosure includes a first enclosure edge, a second enclosure edge opposite the first enclosure edge, and an enclosure center disposed between the first enclosure edge and the second enclosure edge. The assembly further includes a central bladder coupled at the enclosure center of the vacuum tight enclosure, an edge bladder surrounding the central bladder and coupled to the vacuum tight enclosure, and a controller programmed to direct an inflation and a deflation of the edge bladder and the central bladder to manipulate the bond line along the area of the structure.

In an aspect of the present disclosure, the assembly further includes a first vacuum bag sealed to the area of the structure, an adhesive positioned at the area of the structure, and a doubler disposed on top of the adhesive.

In an aspect of the present disclosure, the assembly further includes a lip seal attaching the vacuum tight enclosure to the first vacuum bag.

In an aspect of the present disclosure, the assembly further includes a chamber vacuum source in fluid communication with the vacuum tight enclosure. The chamber vacuum source is configured to draw a vacuum in the vacuum tight enclosure while the edge bladder and the central bladder are deflated to apply a negative pressure over an entirety of the doubler. The central bladder is configured to inflate while the edge bladder is deflated to apply a positive pressure at a center of the doubler to purge entrapped gases beyond a peripheral edge of the doubler. The edge bladder is configured to inflate while the central bladder is deflated to minimize a thickness of the bond line at a peripheral edge of the doubler.

In an aspect of the present disclosure, a method to install a bonded doubler on a structure includes forcing an adhesive in a center of the doubler to displace the adhesive radially outward away from the center of the doubler and minimizing a thickness of an adhesive at a peripheral edge of the doubler at the same time as the adhesive is forced in the center. The method further includes placing a first vacuum bag over the doubler and drawing a vacuum in the first vacuum bag to apply a positive pressure to an entirety of the doubler.

In an aspect of the present disclosure, the method further includes placing a plurality of edge rings around the peripheral edge of the doubler and over the first vacuum bag. The plurality of edge rings includes a first edge ring and a second edge ring. The second edge ring is stacked on the first edge ring. The first edge ring has a first inner diameter. The second edge ring has a second inner diameter. The second inner diameter is less than the first inner diameter to allow the adhesive to move along the peripheral edge of the doubler.

In an aspect of the present disclosure, the method further includes placing a second vacuum bag over the doubler and drawing a vacuum in the second vacuum bag to apply a negative pressure at the peripheral edge of the doubler, thereby causing the adhesive to be displaced radially outward from the doubler center to the peripheral edge to control a thickness of the bond line at the peripheral edge of the doubler.

In an aspect of the present disclosure, the method further includes cleaning an area of the structure before applying the adhesive at the center of the area of the structure.

In an aspect of the present disclosure, the method further includes sanding an area of the structure before applying the adhesive at the center of the area of the structure.

In an aspect of the present disclosure, the method further includes placing a covering over the doubler to form a doubler assembly before placing the first vacuum bag over the doubler. The covering is at least one of a peel ply, a release ply, a breather, or a combination thereof.

In an aspect of the present disclosure, the method further includes placing a pressure transfer pad on top of the first vacuum bag and at the center of the doubler. The pressure transfer pad is configured to transfer pressure applied by the second vacuum bag to the doubler.

In an aspect of the present disclosure, the method further includes placing a top hard plate on the plurality of the edge rings. The plurality of edge rings supports the top hard plate, and the top hard plate applies pressure to the pressure transfer pad upon drawing the vacuum in the second vacuum bag. Placing the second vacuum bag over the doubler includes covering an entirety of the plurality of edge rings, the doubler, and the pressure transfer pad with the second vacuum bag.

In an aspect of the present disclosure, the method further includes placing a pressure transfer pad on top of the first vacuum bag and disposed proximate to the peripheral edge of the doubler. The pressure transfer pad has an annular shape to apply pressure proximate to the peripheral edge of the doubler. The pressure transfer pad is configured to transfer pressure applied by the second vacuum bag to the doubler in the first vacuum bag. The method further includes placing a top hard plate on the plurality of the edge rings. The plurality of edge rings supports the top hard plate. The top hard plate applies pressure to the pressure transfer pad upon drawing the vacuum in the second vacuum bag. Placing the second vacuum bag over the doubler includes covering an entirety of the top hard plate, the doubler, and the pressure transfer pad with the second vacuum bag.

In an aspect of the present disclosure, the method further includes maintaining a full vacuum in a second vacuum bag to displace air bubbles beyond the peripheral edge of the doubler.

In an aspect of the present disclosure, the method further includes venting the second vacuum bag and removing the second vacuum bag from the doubler along the plurality of edge rings and a top hard plate after venting the second vacuum bag.

In an aspect of the present disclosure, the method further includes maintaining a full vacuum in the first vacuum bag until the adhesive is fully cured.

In an aspect of the present disclosure, the method further includes venting the first vacuum bag and removing the first vacuum bag from the doubler after venting the first vacuum bag.

In an aspect of the present disclosure, the method further includes applying heat to the first vacuum bag to cure the adhesive.

In an aspect of the present disclosure, the method further includes placing at least one temperature sensor proximate to the area of the structure to measure a temperature of the adhesive when heat is applied to the first vacuum bag.

In an aspect of the present disclosure, the method further includes receiving a first sensor signal from a first sensor, wherein the first sensor signal is indicative of a pressure in the first vacuum bag, receiving a second sensor signal from a second sensor, wherein the second sensor signal is indicative of a pressure in a second vacuum bag, and controlling, using a feedback control loop, the pressure in the first vacuum bag and the pressure in the second vacuum bag based on the first sensor signal and the second sensor signal to purge entrapped gases and control a thickness of the bond line at the peripheral edge of the doubler.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 9 is a schematic side illustration of the assembly of FIG. 7, wherein an edge bladder and a central bladder are deflated.

FIG. 10 is a schematic side illustration of the assembly of FIG. 7, wherein the central bladder is inflated.

FIG. 11 is a schematic side illustration of the assembly of FIG. 7, wherein the edge bladder is inflated.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
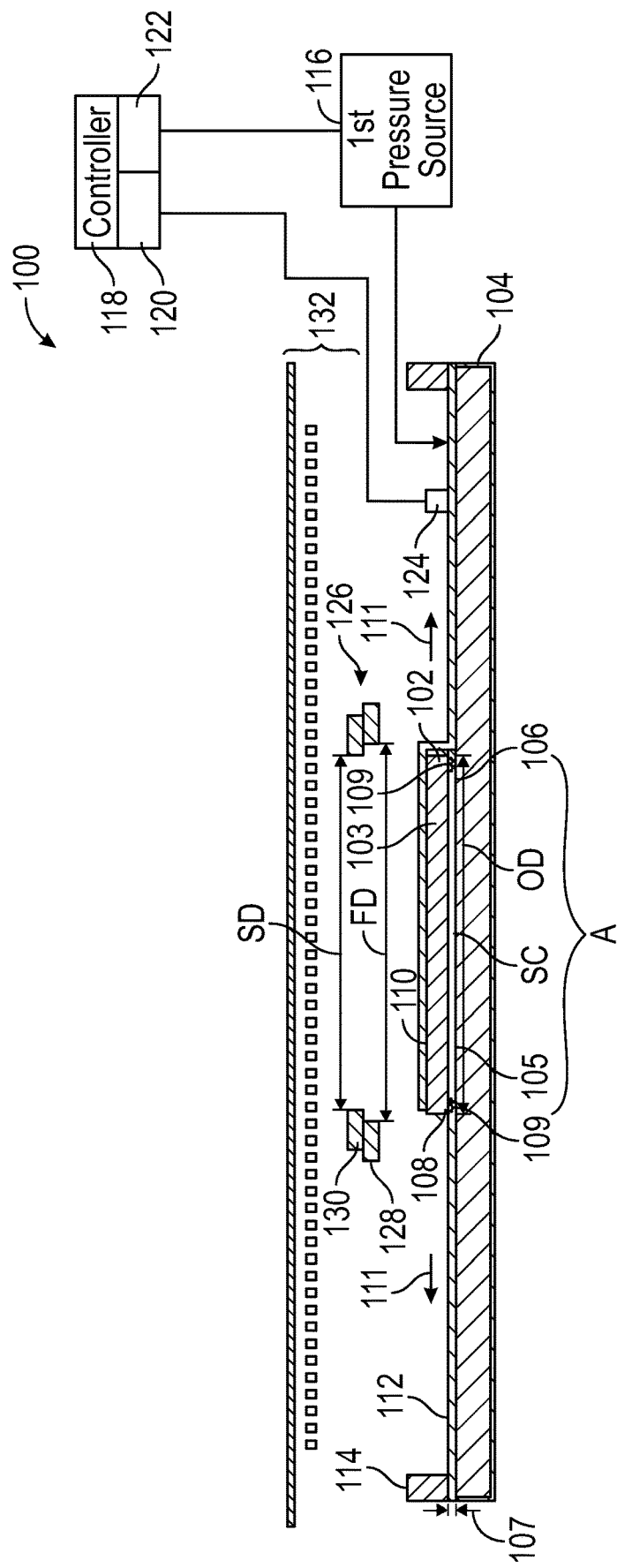
FIG. 1 is a schematic side illustration of part of an assembly for installing a doubler on a structure, depicting a first vacuum bag attached to the doubler.
Figure 2:
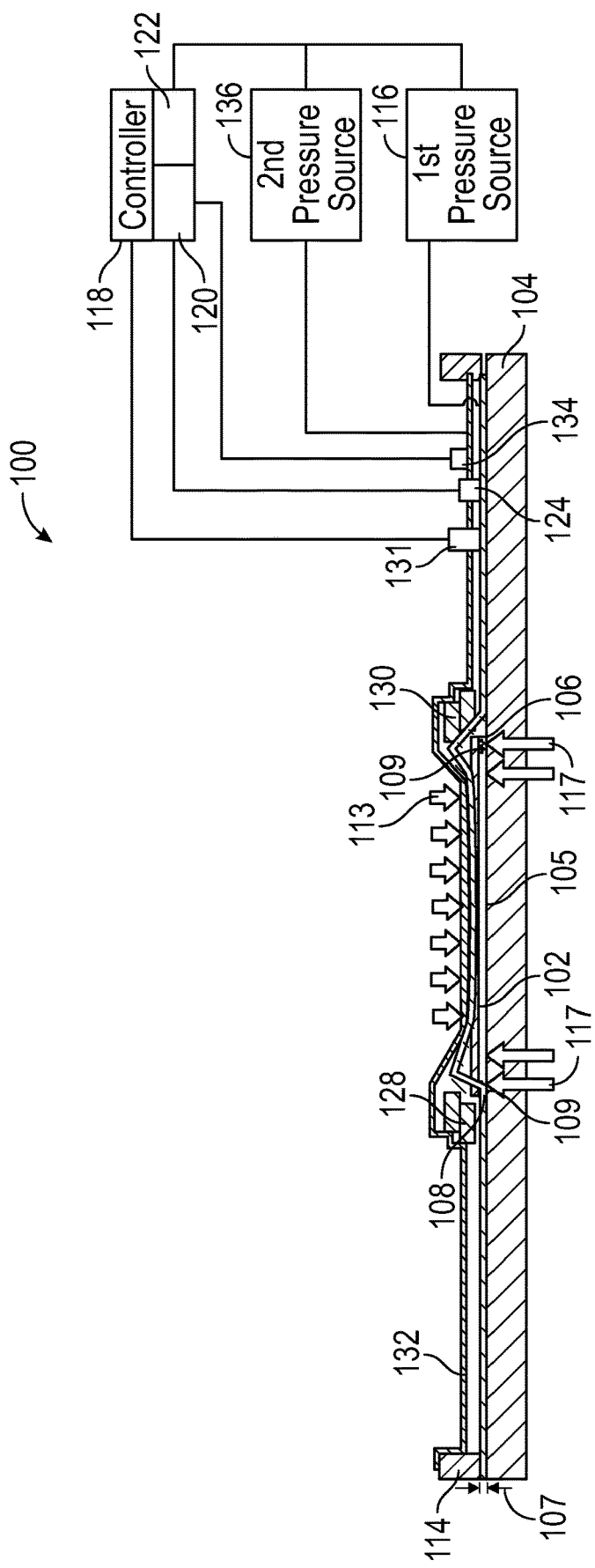
FIG. 2 is a schematic side illustration of part of the assembly of FIG. 1, depicting the first vacuum bag and a second vacuum bag attached to the doubler.

With reference to FIGS. 1 and 2, an assembly 100 is configured to install a doubler 102 on a structure 104. As a non-limiting example, the structure 104 may be a portion of an aircraft that needs to be repaired due to, for example, a crack. However, it is envisioned that the structure 104 may be part of another object, such as a maritime transport vehicle. The doubler 102 may be referred to as a patch and is configured to be placed over the structure 104 in need of repair. The assembly 100 may be used in a method 200 (FIG. 3) to create a large pressure differential at the bond line 105 created by an adhesive 106, such as paste adhesive. In this method 200 (FIG. 3), high pressure is created at the center of the doubler 102 (i.e., the doubler center 103), and low pressure is created at a peripheral edge 108 of the doubler 102, thereby causing a pressure differential. As a result of this pressure differential, the adhesive 106 is displaced radially outward away from the doubler center 103 toward the peripheral edge 108 of the doubler 102, causing the adhesive 106 to purge the air entrapped along the bond line 105. Consequently, air voids along the bond line 105 are collapsed. By using this assembly 100 and the method 200 (FIG. 3) described below, the bond line thickness 107 of the bond line 105 at the peripheral edge 108 of the doubler 102 may be controlled.

With continued reference to FIGS. 1 and 2, the assembly 100 includes a first vacuum bag 112 configured to be placed over the entirety of the doubler 102. An airtight seal, such as the annular airtight seal 114, is configured to couple the first vacuum bag 112 to the structure 104, and the first vacuum bag 112 may be wholly made of a gas-impermeable material. Consequently, air (or another gas such as volatiles) is incapable of escaping the first vacuum bag 112 when the first vacuum bag 112 is coupled to the structure 104 using the annular airtight seal 114. The assembly 100 further includes a first pressure source 116 in fluid communication with the first vacuum bag 112. The first pressure source 116 may include a vacuum pump capable of drawing a vacuum in the first vacuum bag 112. Therefore, upon activation of the first pressure source 116, the first vacuum bag 112 applies a positive pressure to the entirety of the doubler 102.

With continued reference to FIGS. 1 and 2, the assembly 100 further includes a controller 118 in communication with the first pressure source 116, thereby allowing the controller 118 to control the first pressure source 116. The controller 118 includes at least one processor 120 and a non-transitory computer readable storage device or media 122. The processor 120 may be a custom-made processor, a central processing unit (CPU), an auxiliary processor among several processors associated with the controller 118, a semiconductor-based microprocessor (in the form of a microchip or chip set), a macroprocessor, a combination thereof, or generally a device for executing instructions. The computer readable storage device or media 122 may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media 122 may be implemented using a number of memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the controller 118.

With continued reference to FIGS. 1 and 2, the first pressure source 116 may be controlled by the controller 118. To do so, the assembly 100 includes a first sensor 124, such as a pressure sensor, configured to measure the pressure inside the first vacuum bag 112. The first sensor 124 is in communication with the controller 118 and is configured to generate a first sensor signal indicative of the pressure inside the first vacuum bag 112 and/or the positive pressure applied to the doubler 102 by the first vacuum bag 112. The controller 118 is configured to receive the first sensor signal and determine whether the pressure applied to the doubler 102 by the first vacuum bag 112 is substantially equal to the predetermined positive pressure 113. In the present disclosure, the term "substantially equal" means that a value is about ±10% relative to another value.

With continued reference to FIGS. 1 and 2, the assembly 100 includes one or more edge rings 126 that are configured to be placed around the peripheral edge 108 of the doubler 102 and over the first vacuum bag 112. Accordingly, the edge rings 126 are each configured to circumscribe the doubler 102. In the depicted embodiment, the edge rings 126 include a first edge ring 128 and a second edge ring 130. The first edge ring 128 and the second edge ring 130 are configured to be stacked together to achieve a desired height, which is approximately three times the thickness of the doubler 102. The first edge ring 128 has a first inner diameter FD, and the second edge ring 130 has a second inner diameter SD. The second inner diameter SD is less than the first inner diameter FD to allow the adhesive 106 to move toward the peripheral edge 108 of the doubler 102. The first inner diameter SD is about 0.25 inch greater than the outer diameter OD of the doubler 102. The edge rings 126 may be wholly or partly of a flexible but non-compressible material, such as polyethylene, to facilitate cutting while being flexible enough to wrap around a contour (fuselage shape). The edge rings 126 are sufficiently stiff (i.e., non-compressible) to prevent a decrease in thickness under one atmosphere of pressure.

With reference to FIGS. 1 and 2, the assembly 100 further includes a second vacuum bag 132 configured to apply a predetermined negative pressure 117 at the peripheral edge of the doubler 102. The second vacuum bag 132 may be wholly or partly made of a gas impermeable material and is configured to be placed over (and coupled to) the first vacuum bag 112 using the annular airtight seal 114. The assembly 100 further includes a second sensor 134, such as a pressure sensor, coupled to the second vacuum bag 132. The second sensor 134 is configured to measure the pressure inside the second vacuum bag 132 and/or the pressure applied to the negative pressure applied to the doubler 102 at the peripheral edge 108. The second sensor 134 is therefore configured to generate a second sensor signal indicative of the pressure inside the second vacuum bag 132 and/or the pressure applied to the negative pressure applied to the doubler 102 at the peripheral edge 108. Moreover, the second sensor 134 is in communication with the controller 118. Accordingly, the controller 118 is configured to receive the second sensor signal from the second sensor 134 and determine whether the negative pressure applied at the peripheral edge 108 of the doubler 102 is substantially equal to the predetermined negative pressure 117. The assembly 100 may further include a temperature sensor 131 located proximate to the adhesive 106 to measure the temperature of the adhesive 106. The temperature sensor 131 is in communication with the controller 118. Accordingly, the controller 118 is configured to determine the temperature of the adhesive 106 based on the input from the temperature sensor 131.

With reference to FIGS. 1 and 2, the assembly 100 further includes a second pressure source 136 in fluid communication with the second vacuum bag 132. The first pressure source 116 may include a vacuum pump capable of drawing a vacuum in the second vacuum bag 132. Therefore, upon activation of the second pressure source 136, the second vacuum bag 132 applies a negative pressure solely at the peripheral edge of the doubler 102. The controller 118 is electronic communication with the second pressure source 136. Accordingly, the controller 118 is configured to control the operation of the second pressure source 136. It is envisioned that the assembly 100 may solely include one vacuum source capable of drawing a vacuum in the first vacuum bag 112 and the second vacuum bag 132. During the method 200 (FIG. 3), the adhesive 106 degases. Specifically, assembly 100 displaces the gases toward the peripheral edges 108 of the doubler 102. Further, using the first vacuum bag 112 and the second vacuum bag 132 at the same time allows the user to create a desired bond line thickness 107 from the doubler center 103 to the peripheral edges 108 of the doubler 102.

Figure 3:
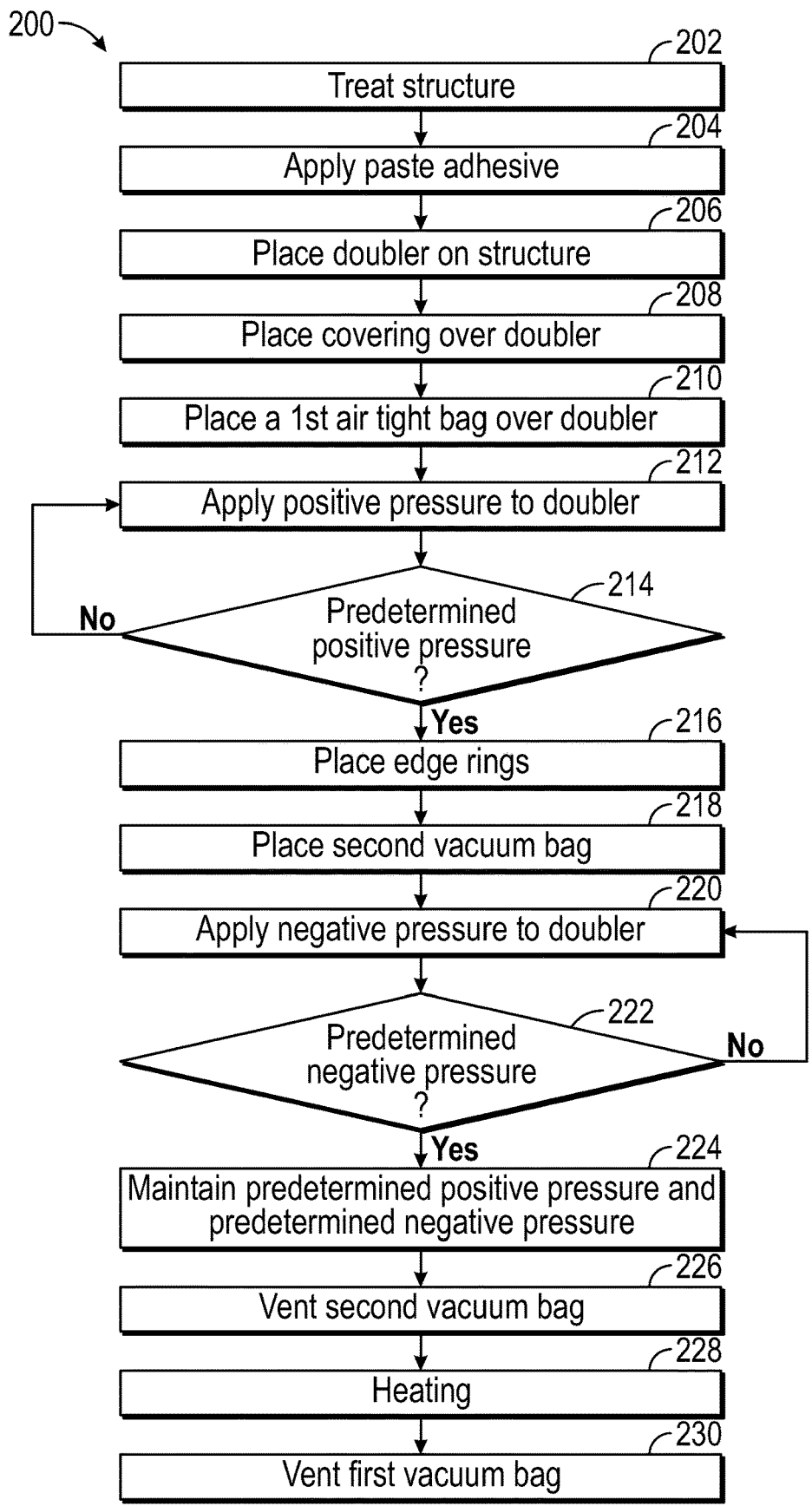
FIG. 3 is a flowchart of a method for installing a bonded doubler on a structure.

With reference to FIGS. 1 and 3, to begin this method 200 at block 202, the structure 104 may be cleaned, sanded, or otherwise treated to facilitate the application of the adhesive 106 on the structure 104. The structure 104 may be cleaned to remove unwanted substances, such as debris, from the surfaces of the structure 104. To do so, a gas (e.g., air) or liquid (e.g., water) may be applied to the surfaces of the structure 104. The structure 104 may be sanded by smoothing the surfaces of the structure 104 with a sandpaper and/or a mechanical sander. Then, at block 204, the adhesive 106 is placed between the doubler 102 and the structure 104 as shown in FIG. 1. For instance, the adhesive 106 may be applied to both the doubler 102 and the structure 104. The adhesive 106 may be placed solely at (or around) a center SC of an area A of the structure 104 that needs repair. The area A of the structure 104 that needs repair may be alternatively referred to as the bond location. Additional adhesive 106, such as a mass, blob, or bulk, may be placed at the center SC of the area A of the structure 104. The additional adhesive 106 facilities the radial movement of the adhesive 106 from the doubler center 103 of the doubler 102 toward the peripheral edges 108 of the doubler 102 to purge entrapped gases 109, such as entrapped air, out in a radial direction 111. The amount of adhesive 106 placed at the center C of the area A of the structure 104 depends on the size of the doubler 102. As a non-limiting example, if the doubler 102 has a six-inch diameter, then the bulk of the adhesive 106 may be three to five grams to ensure that the entrapped gases 109 is purged. Then, the method 200 proceeds to block 206.

At block 206, the doubler 102 is placed on the area A of the structure 104 that needs repair as shown in FIG. 1. The method 200 then proceeds to block 208. At block 208, a covering 110 is placed over the doubler 102. The covering 110 may be a peel ply, a breather, or a combination thereof. The covering 110 and the doubler 102 may be collectively referred to as a doubler assembly. Next, the method 200 continues to block 210. At block 210, a first vacuum bag 112 is placed over the doubler 102. The first vacuum bag 112 may be alternatively referred to as the lower vacuum bag and is placed over an entirety of the doubler 102. Drawing a vacuum in the first vacuum bag 112 creates a vacuum chamber under the first vacuum bag 112, while drawing a vacuum in the second vacuum bag 132 creates a vacuum chamber under the second vacuum bag 132. An airtight seal, such as the annular airtight seal 114, may be used to couple the first vacuum bag 112 to the structure 104, and the first vacuum bag 112 may be wholly made of a gas-impermeable sealant. Consequently, air (or another gas) is incapable of escaping the first vacuum bag 112 when the first vacuum bag 112 is coupled to the structure 104 using the annular airtight seal 114.

With continued reference to FIGS. 1 and 3, the first pressure source 116 is activated to draw a vacuum in the first vacuum bag 112 at block 212. As a consequence, the first vacuum bag 112 applies a predetermined positive pressure 113 to the entirety of the doubler 102 to displace the adhesive 106, which is located between the doubler 102 and the structure 104, from the doubler center 103 toward the peripheral edge 108 of the doubler 102, thereby forcing entrapped gases 109 toward the peripheral edge 108. Forcing the adhesive 106 toward the peripheral edge 108 liberates the entrapped gases 109. As a non-limiting example, the predetermined positive pressure 113 applied at (or around) the doubler center 103 may be one atmosphere to displace the adhesive 106 from the doubler center 103 toward the peripheral edge 108 of the doubler 102 to minimize the thickness of the adhesive 106 while forcing entrapped gases 109 toward the peripheral edge 108. When this amount of vacuum is drawn within the first vacuum bag 112, then the external atmospheric pressure is able to apply the predetermined pressure 113 discussed above. At this time, however, the radial flow of adhesive 106 may stop at (or near) the peripheral edge 108 of the doubler 102 due to the shape of the peripheral edge 108.

With continued reference to FIGS. 1 and 3, at block 216, the controller 118 compares the pressure inside the first vacuum bag 112, as measured by the first sensor 124, with predetermined positive pressure 113 to determine whether the pressure inside the first vacuum bag 112 is substantially equal to the predetermined positive pressure 113. If the pressure inside the first vacuum bag 112 is not substantially equal to the predetermined positive pressure 113, then the method 200 returns to block 212, where the controller 118 controls the first pressure source 116 to reach the predetermined positive pressure 113 inside the first vacuum bag 112. However, if the pressure inside the first vacuum bag 112 is substantially equal to the predetermined positive pressure 113, then the predetermined positive pressure 113 is maintained inside the first vacuum bag 112 and the method 200 proceeds to block 216. The controller 118 also uses the feedback from the first sensor 124 to maintain the predetermined positive pressure 113 inside the first vacuum bag 112. Accordingly, the controller 118 uses a feedback control loop to achieve and maintain the predetermined positive pressure 113 inside the first vacuum bag 112.

At block 216, one or more edge rings 126 are placed around the peripheral edge 108 of the doubler 102 and over the first vacuum bag 112. Accordingly, the edge rings 126 circumscribe the entirety of the doubler 102. The edge rings 126 are centered over the doubler 102 in the first vacuum bag 112. In the depicted embodiment, the first edge ring 128 and the second edge ring 130 are placed over the doubler 102. However, it is envisioned that more than two edge rings 126 may be placed over the doubler 102. Then, the method 200 proceeds to block 218.

At block 218, the second vacuum bag 132 is placed directly over the entirety of the first vacuum bag 112 and the entirety of the edge rings 126. The annular airtight seal 114 is used to couple the second vacuum bag 132 to the first vacuum bag 112. Once the second vacuum bag 132 is placed and connected to the first vacuum bag 112, then the method 200 proceeds to block 220.

At block 220, the second pressure source 136 is activated to draw a vacuum in the second vacuum bag 132 while maintaining the vacuum in the first vacuum bag 112. As a result, the negative pressure is created at a space between the second vacuum bag 132 and the first vacuum bag 112 near the peripheral edge 108 of the doubler 102. The vacuum in the second vacuum bag 132 may differ from the vacuum in the first vacuum bag 112. This negative pressure space in turn cancels out the positive pressure acting on the peripheral edge 108 of the doubler 102 contained in the first vacuum bag 112. This eliminates the edge clamping effect at the peripheral edge 108 of the doubler 102 that prevents the adhesive 106 from purging the entrapped gases from the bond line 105. Simultaneously, the second vacuum bag 132 is in direct contact with the first vacuum bag 112 over an area around the doubler center 103 of the doubler 102 while the first vacuum bag 112 still applies the predetermined positive pressure 113 to the doubler 102. The elimination of the edge clamping allows the adhesive 106 to flow toward the peripheral edge 108 of the doubler 102, thereby purging the air from the bond line 105. The method 200 then proceeds to block 222.

At block 222, the controller 118 compares the pressure inside the second vacuum bag 132, as measured by the second sensor 134, with the predetermined negative pressure 117 to determine whether the pressure inside the second vacuum bag 132 is substantially equal to the predetermined negative pressure 117. If the pressure inside the second vacuum bag 132 is not substantially equal to the predetermined negative pressure 117, then the method 200 returns to block 220, where the controller 118 controls the second pressure source 136 to reach the predetermined negative pressure 117 inside the second vacuum bag 132. However, if the pressure inside the second vacuum bag 132 is substantially equal to the predetermined negative pressure 117, then the predetermined negative pressure is maintained inside the second vacuum bag 132 and the method 200 proceeds to block 224. The controller 118 also uses the feedback from the second sensor 134 to maintain the predetermined negative pressure 117 inside the second vacuum bag 132. Accordingly, the controller 118 uses a feedback control loop to achieve and maintain the predetermined negative pressure 117 inside the second vacuum bag 132.

At block 224, the predetermined positive pressure 113 and the predetermined negative pressure 117 are maintained for a predetermined amount of time (e.g., one to five minutes) sufficient to allow the adhesive 106 to flow all the way to (and beyond) the peripheral edge 108 of the doubler 102, thereby securely bonding the doubler 102 to the structure 104. The predetermined amount of time depends on the size of the doubler 102 and the viscosity of the adhesive 106. Regardless, the predetermined amount of time is more than 1 second. Then, the method 200 proceeds to block 226.

At block 226, the second vacuum bag 132 is vented to complete the consolidation of the bond line 105 while a full vacuum is maintained in the first vacuum bag 112 while the adhesive 106 fully cures. At block 226, the edge rings 126 are removed from the first vacuum bag 112. The method 200 then continues to block 228.

At block 228, heating, if necessary, may be applied to the adhesive 106 to cure the adhesive 106. For instance, a heat blanket may be used to heat the adhesive 106. This heat blanket may be added to the second vacuum bag 132. The controller 118 may determine that the adhesive 106 is fully cured based on the temperature of the adhesive 106 measured by the temperature sensor 131. Once the adhesive 106 is fully cured, the method 200 proceeds to block 230. At block 230, the first vacuum bag 112 is vented.

Figure 4:
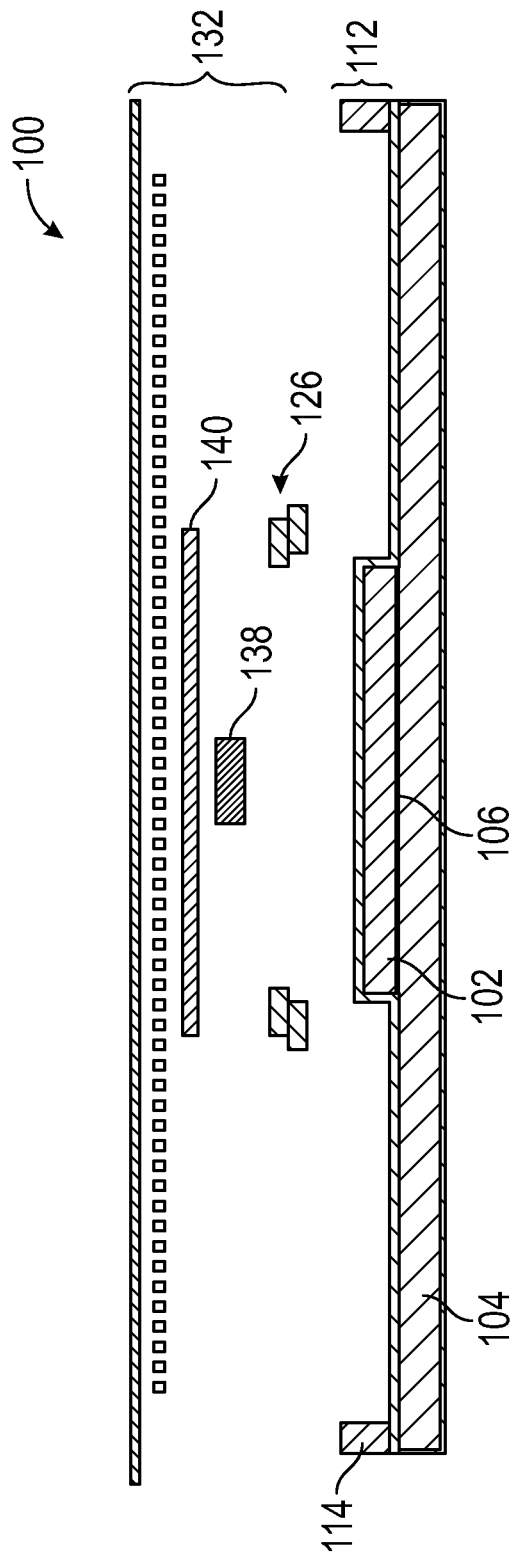
FIG. 4 is a schematic side illustration of part of an assembly for installing a doubler on a structure, depicting a first vacuum bag attached to the doubler in accordance with an aspect of the present disclosure.
Figure 5:
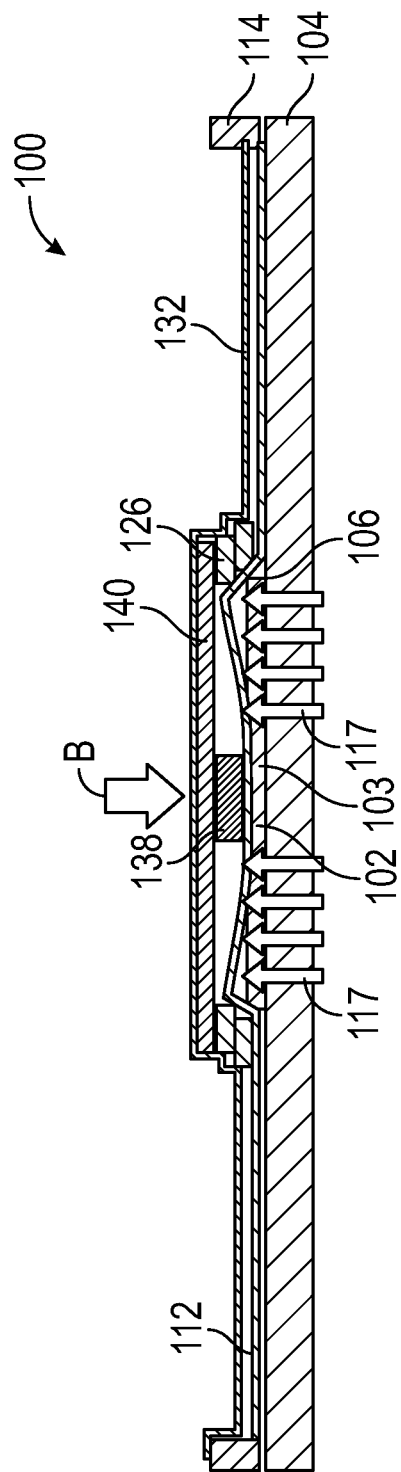
FIG. 5 is a schematic side illustration of part of the assembly of FIG. 4, depicting the first vacuum bag and a second vacuum bag attached to the doubler.

With reference to FIGS. 4 and 5, in accordance with another aspect of the present disclosure, the assembly 100 is substantially similar to the assembly 100 depicted in FIGS. 1 and 2, except for the features described below. Further, the assembly 100 includes a pressure transfer pad 138, which may be wholly or partly made of an elastomeric material or a foam material and is configured to be placed on top of the first vacuum bag 112 at the doubler center 103 of the doubler 102. The pressure transfer pad 138 is configured to transfer pressure applied by the second vacuum bag 132 to the doubler 102. The assembly 100 further includes a top hard plate 140 configured to be disposed on top of the edge rings 126. Thus, the edge rings 126 directly support the top hard plate 140. The top hard plate 140 may be wholly or partly made of aluminum or composite sheet stock material and spans the top of the edge rings 126 and the pressure transfer pad 138 to create a vacuum chamber that removes atmospheric pressure over the entirety of the doubler 102 located in the first vacuum bag 112. During use, the top hard plate 140 applies pressure to the pressure transfer pad 138 upon drawing the vacuum in the second vacuum bag 132. In this case, the second vacuum bag 132 is placed over the doubler 102 to cover the entirety of the edge rings 126, the doubler 102, and the pressure transfer pad 138. During use, the pressure transfer pad 138 transmits the atmospheric pressure acting on the top hard plate directly to the doubler center 103 of the doubler 102 in the first vacuum bag 112 just in the area covered by the pressure transfer pad 138 as indicated by arrow B. Simultaneously, the atmospheric pressure is removed from the doubler 102 for the entire area that is not covered by the pressure transfer pad 138. As a result, the positive pressure effects are amplified when the method 200 is executed with the assembly 100 including the top hard plate 140 and the pressure transfer pad 138.

Figure 6:
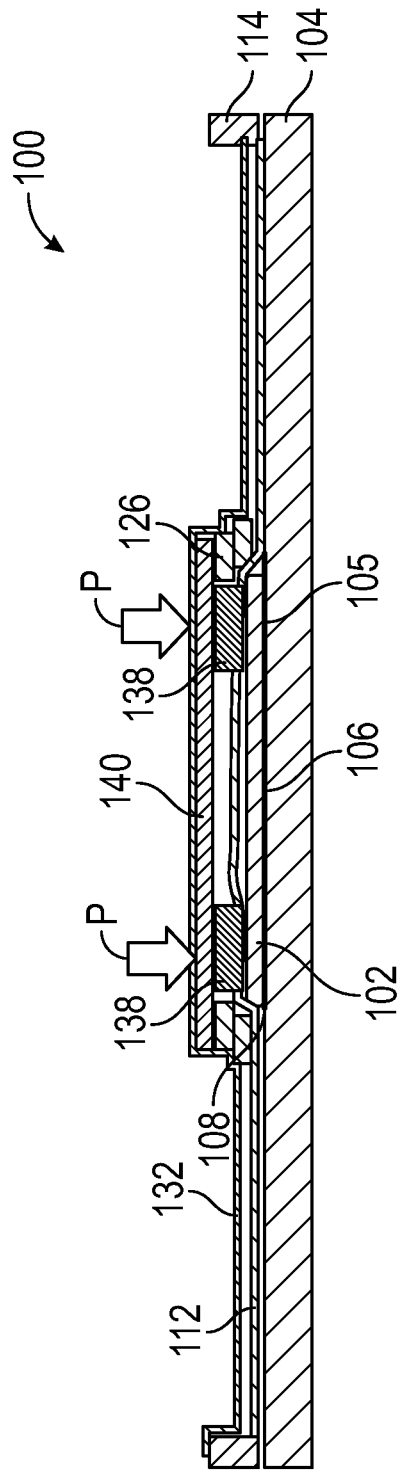
FIG. 6 is a schematic side illustration of an assembly for installing a doubler on a structure in accordance with another aspect of the present disclosure.

With reference to FIG. 6, the assembly 100 is substantially similar to the assembly 100 depicted in FIGS. 4 and 5, except for the features described below, the method 200 (FIG. 3) may be used with this assembly 100 to create bond line 105 at the peripheral edge 108 of the doubler 102 that is thinner when the method 200 is executed with other embodiments. Additionally, the flow direction of the negative pressure P may be reversed to create a thin bond line 105 to, for example, increase shear strength. In this embodiment, the pressure transfer pad 138 has an annular shape and is placed proximate to the peripheral edge 108 of the doubler 102 to order to apply the predetermined positive pressure 113 at a location proximate to the peripheral edge 108 of the doubler 102. The pressure transfer pad 138 is placed on top of the first vacuum bag 112, and then the pressure transfer pad 138 is placed proximate to the peripheral edge 108 of the doubler 102. Then, the top hard plate 140 is placed on the edge rings 126. The second vacuum bag 132 is placed over the top hard plate 140. Next, a full vacuum is drawn in the second vacuum bag 132. As a consequence, the top hard plate 140 applies pressure on the pressure transfer pad 138. The full vacuum is maintained in the second vacuum bag 132 to displace air bubbles beyond the peripheral edge 108 of the doubler 102. Then, the second vacuum bag 132 is vented. Next, the second vacuum bag 132 is removed from the doubler 102.

Figure 8:
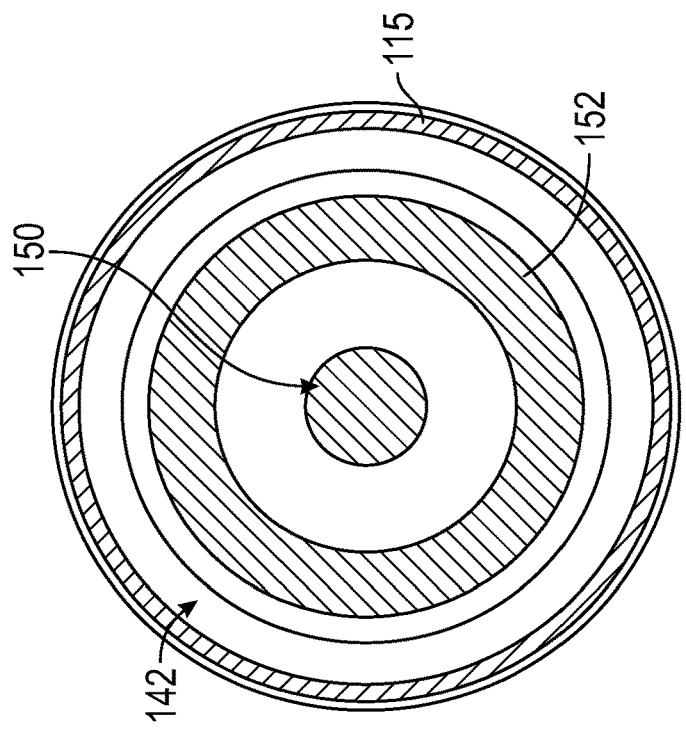
FIG. 8 is a schematic bottom illustration of part of the assembly of FIG. 7.
Figure 7:
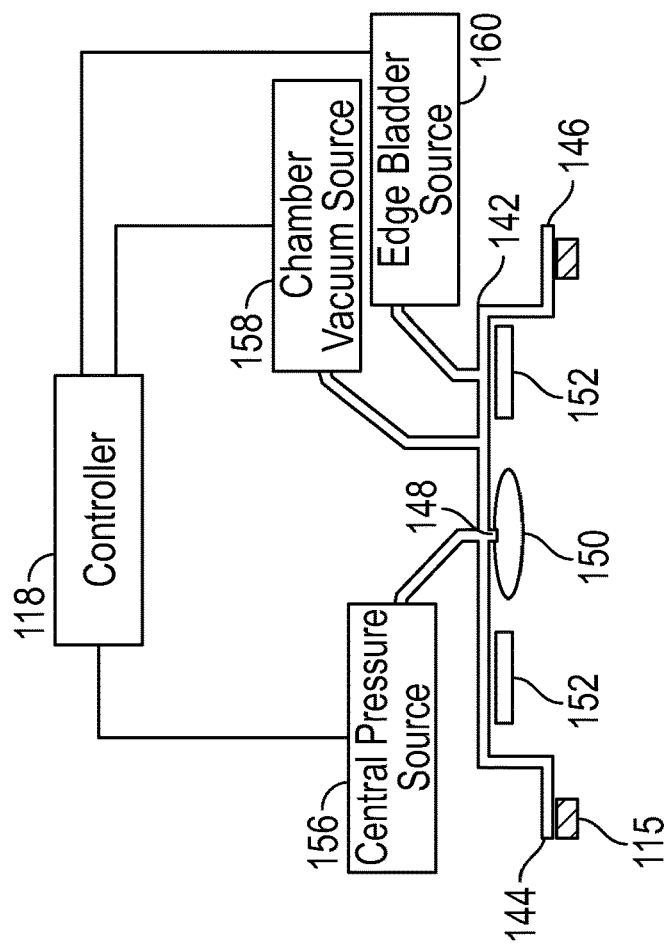
FIG. 7 is a schematic side illustration of part of an assembly for installing a doubler on a structure in accordance with another aspect of the present disclosure.

With reference to FIGS. 7 and 8, in the depicted embodiment, the assembly 100 includes a vacuum tight enclosure 142. The vacuum tight enclosure 142 includes a first enclosure edge 144, a second enclosure edge 146 opposite the first enclosure edge 144, and an enclosure center 148 disposed between the first enclosure edge 144 and the second enclosure edge 146. The assembly 100 further includes a central bladder 150 coupled at the enclosure center 148 of the vacuum tight enclosure 142. The assembly 100 further includes an edge bladder 152 that surrounds the central bladder 150 and is coupled to the vacuum tight enclosure 142. A lip seal 115 may be used to couple the vacuum tight enclosure 142 to the first vacuum bag 112. The assembly 100 further includes a central pressure source 156 in fluid communication with the central bladder 150, a chamber vacuum source 158 in fluid communication with the vacuum tight enclosure 142, and an edge bladder source 160 in fluid communication with the edge bladder 152. The controller 118 is in communication with the central pressure source 156, the chamber vacuum source 158, and the edge bladder source 160 to direct the inflation and the deflation of the edge bladder 152, the central bladder 150, and the vacuum tight enclosure 142 to manipulate the bond line 105 (FIG. 1) along the area of the structure 104 (FIG. 1).

With reference to FIGS. 7 and 9, the vacuum tight enclosure 142 is coupled to the first vacuum bag 112 using the lip seal 115. As in the other embodiments, the adhesive 106 is disposed between the doubler 102 and the structure 104. The doubler 102 is disposed on top of the adhesive 106. The chamber vacuum source 158 is configured to draw a vacuum in the vacuum tight enclosure 142 while the edge bladder 152 and the central bladder 150 are deflated to apply a negative pressure over the entirety of the doubler 102.

With reference to FIGS. 7 and 10, the central pressure source 156 is configured to inflate the central bladder 150 while the edge bladder 152 is deflated to apply a positive pressure at the doubler center 103 of the doubler 102 to purge entrapped gases beyond the peripheral edge 108 of the doubler 102.

With reference to FIGS. 7 and 11, the edge bladder source 160 is configured to inflate while the central bladder 150 is deflated to minimize a thickness of the bond line 105 at the peripheral edge 108 of the doubler 102.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The terms "A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A method of eliminating voids and manipulating a bond line, comprising:
   applying an adhesive at a center of an area of a structure;
   placing a doubler on the adhesive over the area of the structure, wherein the doubler has a doubler center and a peripheral edge that surrounds the doubler center;
   maintaining a negative pressure at the peripheral edge of the doubler while simultaneously maintaining a positive pressure at the doubler to purge entrapped gases and control a thickness of the bond line at the peripheral edge of the doubler;
   placing a first vacuum bag over the doubler; and
   placing a plurality of edge rings around the peripheral edge of the doubler and over the first vacuum bag, wherein the plurality of edge rings includes a first edge ring and a second edge ring, and wherein the second edge ring is stacked on the first edge ring.

2. The method of claim 1, further comprising:
   drawing a vacuum in the first vacuum bag to apply the positive pressure to an entirety of the doubler.

3. The method of claim 2, wherein:
   the first edge ring has a first inner diameter, the second edge ring has a second inner diameter, and the second inner diameter is less than the first inner diameter to allow the adhesive to move along the peripheral edge of the doubler.

4. The method of claim 3, further comprising:
   placing a second vacuum bag over the doubler; and
   drawing a vacuum in the second vacuum bag to apply the negative pressure at the peripheral edge of the doubler, thereby causing the adhesive to be displaced radially outward from the doubler center to the peripheral edge to control the thickness of the bond line at the peripheral edge of the doubler.

5. The method of claim 4, further comprising placing a covering over the doubler to form a doubler assembly before placing the first vacuum bag over the doubler, wherein the covering is at least one of a peel ply, a release ply, a breather, or a combination thereof.

6. The method of claim 5, further comprising placing a pressure transfer pad on top of the first vacuum bag and at the doubler center, wherein the pressure transfer pad is configured to transfer pressure applied by the second vacuum bag to the doubler.

7. The method of claim 6, further comprising:
   placing a top hard plate on the plurality of the edge rings, wherein the plurality of edge rings supports the top hard plate, and the top hard plate applies pressure to the pressure transfer pad upon drawing the vacuum in the second vacuum bag; and
   wherein placing the second vacuum bag over the doubler includes covering an entirety of the plurality of edge rings, the doubler, and the pressure transfer pad with the second vacuum bag.

8. The method of claim 5, further comprising:
   placing a pressure transfer pad on top of the first vacuum bag and disposed proximate to the peripheral edge of the doubler, wherein the pressure transfer pad has an annular shape to apply pressure proximate to the peripheral edge of the doubler, and the pressure transfer pad is configured to transfer pressure applied by the second vacuum bag to the doubler in the first vacuum bag;
   placing a top hard plate on the plurality of the edge rings, wherein the plurality of edge rings supports the top hard plate, and the top hard plate applies pressure to the pressure transfer pad upon drawing the vacuum in the second vacuum bag; and
   wherein placing the second vacuum bag over the doubler includes covering an entirety of the top hard plate, the doubler, and the pressure transfer pad with the second vacuum bag.

9. The method of claim 1, further comprising cleaning the area of the structure before applying the adhesive at the center of the area of the structure.

10. The method of claim 1, further comprising sanding the area of the structure before applying the adhesive at the center of the area of the structure.

11. The method of claim 1, further comprising:
    drawing a vacuum in the first vacuum bag to apply the positive pressure to an entirety of the doubler;
    placing a second vacuum bag over the doubler;
    drawing a vacuum in the second vacuum bag to apply the negative pressure at the peripheral edge of the doubler, thereby causing the adhesive to be displaced radially outward from the doubler center to the peripheral edge to control the thickness of the bond line at the peripheral edge of the doubler;
    receiving a first sensor signal from a first sensor, wherein the first sensor signal is indicative of a pressure inside the first vacuum bag;
    receiving a second sensor signal from a second sensor, wherein the second sensor signal is indicative of a pressure inside the second vacuum bag; and
    controlling, using a feedback control loop, the pressure in the first vacuum bag and the pressure in the second vacuum bag based on the first sensor signal and the second sensor signal to purge entrapped gases and control the thickness of the bond line at the peripheral edge of the doubler.

12. The method of claim 1, further comprising:
    drawing a vacuum in the first vacuum bag to apply the positive pressure to an entirety of the doubler;
    placing a second vacuum bag over the doubler;
    drawing a vacuum in the second vacuum bag to apply the negative pressure at the peripheral edge of the doubler, thereby causing the adhesive to be displaced radially outward from the doubler center to the peripheral edge to control the thickness of the bond line at the peripheral edge of the doubler; and maintaining a full vacuum in the second vacuum bag to displace air bubbles beyond the peripheral edge of the doubler.

13. The method of claim 1, further comprising:
drawing a vacuum in the first vacuum bag to apply the positive pressure to an entirety of the doubler; and
maintaining a full vacuum in the first vacuum bag until the adhesive is fully cured.

14. A method to install a bonded doubler on a structure, comprising:
forcing an adhesive in a center of the doubler to displace the adhesive radially outward away from the center of the doubler;
controlling a thickness of the adhesive at a peripheral edge of the doubler at the same time as the adhesive is forced in a center of the structure;
placing a first vacuum bag over the doubler;
drawing a vacuum in the first vacuum bag to apply a positive pressure to an entirety of the doubler; and
placing a plurality of edge rings around the peripheral edge of the doubler and over the first vacuum bag, wherein the plurality of edge rings includes a first edge ring and a second edge ring, the second edge ring is stacked on the first edge ring, the first edge ring has a first inner diameter, the second edge ring has a second inner diameter, and the second inner diameter is less than the first inner diameter to allow the adhesive to move along the peripheral edge of the doubler.

15. The method of claim 14, further comprising:
placing a second vacuum bag over the doubler; and
drawing a vacuum in the second vacuum bag to apply a negative pressure at the peripheral edge of the doubler, thereby causing the adhesive to be displaced radially outward from the center of the doubler to the peripheral edge to control a thickness of a bond line at the peripheral edge of the doubler.

16. The method of claim 15, further comprising placing a covering over the doubler to form a doubler assembly before placing the first vacuum bag over the doubler, wherein the covering is at least one of a peel ply, a release ply, a breather, or a combination thereof.

17. The method of claim 16, further comprising placing a pressure transfer pad on top of the first vacuum bag and at the center of the doubler, wherein the pressure transfer pad is configured to transfer pressure applied by the second vacuum bag to the doubler.

18. The method of claim 17, further comprising:
placing a top hard plate on the plurality of the edge rings, wherein the plurality of edge rings supports the top hard plate, and the top hard plate applies pressure to the pressure transfer pad upon drawing the vacuum in the second vacuum bag; and
wherein placing the second vacuum bag over the doubler includes covering an entirety of the plurality of edge rings, the doubler, and the pressure transfer pad with the second vacuum bag.

19. The method of claim 14, further cleaning an area of the structure before applying the adhesive at the center of the area of the structure.

20. A method of eliminating voids and manipulating a bond line, comprising:
applying an adhesive at a center of an area of a structure;
placing a doubler on the adhesive over the area of the structure, wherein the doubler has a peripheral edge;
maintaining a negative pressure at the peripheral edge of the doubler while simultaneously maintaining a positive pressure at the doubler to purge entrapped gases and control a thickness of the bond line at the peripheral edge of the doubler;
placing a first vacuum bag over the doubler; and
placing a plurality of edge rings around the peripheral edge of the doubler and over the first vacuum bag, wherein the plurality of edge rings includes a first edge ring and a second edge ring, the second edge ring is stacked on the first edge ring, the first edge ring has a first inner diameter, the second edge ring has a second inner diameter, and the second inner diameter is less than the first inner diameter to allow the adhesive to move along the peripheral edge of the doubler.

* * * * *